Jan. 11, 1949.   L. L. HYLER   2,458,781
UNIVERSAL HITCH
Filed Feb. 6, 1946
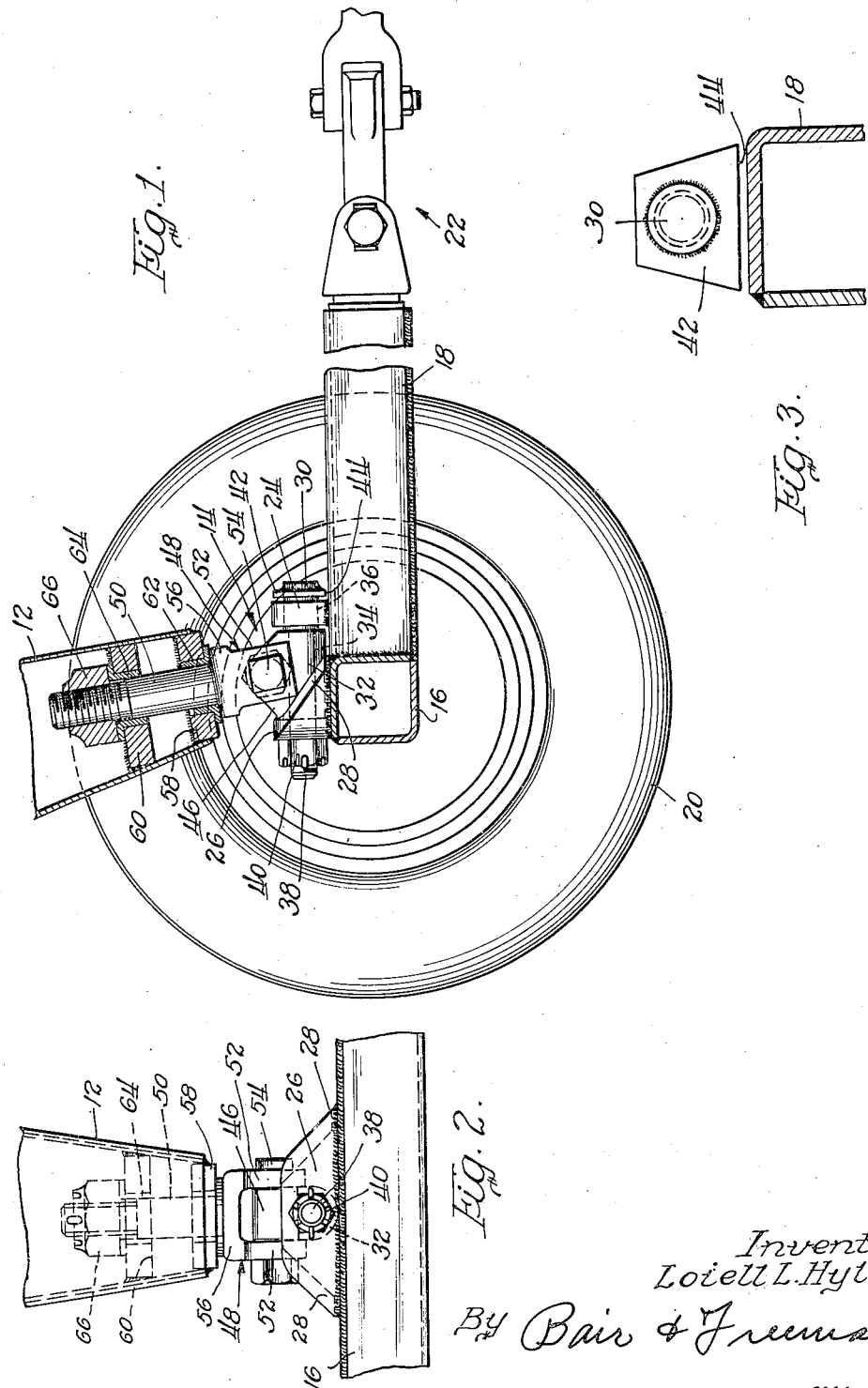
Inventor:
Lovell L. Hyler.
By Bair & Freeman
Attorneys.

Patented Jan. 11, 1949

2,458,781

UNITED STATES PATENT OFFICE 2,458,781

UNIVERSAL HITCH

Loiell L. Hyler, Cedar Rapids, Iowa, assignor to La Plant-Choate Manufacturing Co., Inc., Cedar Rapids, Iowa, a corporation of Delaware Application February 6, 1946, Serial No. 645,755

2 Claims. (Cl. 287—100)

This invention relates to vehicle hitches, and particularly hitches used between a vehicle frame and the supporting axle.

In the use of heavy machinery, like earth working machine, the jars and jolts cause serious wear on the connecting parts; the situation is worse when such machinery is drawn by track laying tractors, since the forward motion is pulsating due to the articulated formation of the tracks, and this action results in greatly increased wear on the connecting parts. My invention overcomes the above-mentioned objection to a considerable degree.

It is therefore an object of my invention to provide a connection which can be brought to perfect adjustment in any condition of wear.

Another object of the invention is to provide a connection in which the threads on the parts of the connection are relieved of all abnormal strain.

Still another object is the provision of a universal connection which can be adjusted to compensate for wear on its parts.

A further object is the provision of a connection in which a pin is utilized to secure a swivel block to a body, and in which the swivel block is held against thrust in one direction by a bracket on the body and in the other direction by an enlarged projection on the pin which, in turn, is held against thrust by the bracket.

With these and other objects in view, my invention consists in the construction, arrangement, and combination of the various parts of my device, whereby the objects contemplated are attained, as hereinafter more fully set forth, pointed out in my claims, and illustrated in the accompanying drawings, wherein:

Fig. 1 is a view, partly in vertical section, and partly in elevation of the hitch of my invention;

Fig. 2 is an elevational view as viewed from the left of Fig. 1; and

Fig. 3 is an enlarged end view of the pin for securing the swivel in place.

Referring in detail to the drawings, I have shown at 12 the main frame pedestal which supports the front end of a piece of earth working machinery. The pedestal 12 is supported, through the universal hitch 14 forming the principal feature of my invention, by axle 16 and tongue 18, which in turn are supported by wheels 20. A conventional universal hitch 22 is provided for hitching the machine to a tractor. A bracket or bearing block 24 is welded on the tongue 18 and is formed with an opening therein. Rearwardly of the bearing block 24 is another bearing block 26 having forwardly extending ears 28 and being welded to the axle 16. The bearing block 26 also is formed with an opening therein in alignment with the opening in the bearing block 24, but it is smaller than the latter opening. A pin 30 is inserted through the openings in the bearing blocks 24 and 26 from the front to the rear for supporting swivel block 32. The pin 30 is formed with a main length 34 and an enlarged shoulder portion 36. The openings in the bearing blocks 24 and 26 are of such sizes to accommodate the portions 36 and 34, respectively, of the pin 30 and provide a snug fit or bearing therefor. The rear end of the reduced portion 34 of the pin 30 is threaded as shown at 38 for the reception of a nut 40 for securing the pin in place. A polygonally shaped stop 42 (see also Fig. 3) is welded to the front end of the pin 30 on the enlarged portion 36 thereof, and has one face 44 of substantial dimension. When the pin 30 is in place, the face 44 of the stop 42 is substantially in engagement with the tongue 18 to prevent the pin 30 from turning.

The swivel block 32 is cylindrical for the main part and is adapted to swivel about the axis of the pin 30. Also, the swivel block is shorter than the distance between the bearing blocks 24 and 26 so that when the nut 40 is tightened, the swivel block is secured tightly between the shoulder 36 on the pin 30 and the bearing block 26. The shoulder 36 is longer than the longitudinal distance through the bearing block 24, and the stop 42 is spaced far enough ahead on the shoulder 36 to leave a space between itself and the bearing block 24 to allow for rearward tightening of the pin 30. By this arrangement the swivel block 32 can always be kept in tight adjustment regardless of its condition of wear.

A lug 46 is formed laterally on the swivel block 32 which supports the forked lower end 48 of a vertical bolt 50. The ears 52 of the fork 48 fit over the lug 46 and are secured thereto by a pin 54 passing through holes in the ears 52 and the lug 46, whereby the bolt 50 can rock about the axis of the pin 54. The parts of the connection 14 described up to this point furnish universal motion, there being swivelling movement about the axes 30 and 54 disposed at right angles to each other.

The bolt 50 is formed with an enlarged shoulder 56 at its lower end and above the forked portion 48. The pedestal 12 is supported by the bolt 50 by blocks 58 and 60 welded in the interior of the pedestal to the walls thereof. The blocks 58 and 60 are formed with central openings in which are fitted bushings 62 and 64, respectively, the bushings having direct bearing on the bolt 50, and the bushing 62 being in contact with the shoulder 56. The upper end of the bolt 50 is threaded for the reception of a nut 66 for securing the pedestal in place. The pedestal 12 is free for swivelling movement on the bolt 50.

From the foregoing, it will be seen that I have provided a new construction whereby the parts can be taken up and kept in a state of perfect adjustment regardless of their condition of wear. The swivel block 32 bears against the bearing block 26 in the forward motion of the machine, and the pin 30 being in tightened condition, the shoulder 36 prevents the swivel block from jarring and jolting back and forth. Jars and jolts are present to a great degree due to the type of machinery and the work to which it is put, e. g., an earth scraper; and conditions are made worse when such a machine is drawn by a track-laying tractor, because the articulated formation of the tracks causes pulsating motion. The bearing block 26 is adapted to receive the heavy thrust from the machine because the ears 28 furnish greater area for securement, and their being at an angle to the block 26 gives added strength.

While I have herein shown and described a preferred embodiment of my invention, manifestly it is susceptible of modification and rearrangement of parts without departing from the spirit and scope thereof. I do not, therefore, wish to be understood as limiting this invention to the precise form herein disclosed, except as I may be so limited by the appended claims.

I claim as follows:

1. In a connection of the class described, a supporting member, a pair of bearing blocks formed on the supporting member, the bearing blocks having aligned openings therein, one of the openings being larger than the other, a pin having an enlarged end formed thereon mounted in the openings, the enlarged end of the pin being positioned in the larger opening, forwardly extending ears on the bearing block containing the smaller opening, a swivel block rotatably mounted on the pin between the enlarged end thereof and the opposite bearing block, and means for securing the pin in the bearing blocks.

2. In a connection of the class described, a supporting member, a pair of bearing blocks formed on the supporting member, the bearing blocks having aligned openings therein, one of the openings being larger than the other, a pin having an enlarged end formed thereon mounted in the openings, the enlarged end of the pin being positioned in the larger opening, a swivel block rotatably mounted on the pin between the enlarged end thereof and the opposite bearing block, means for preventing rotation of the pin comprising a plate secured to said enlarged end and disposed outwardly of one of said bearing blocks, and means for securing the pin in the bearing blocks.

LOIELL L. HYLER.

REFERENCES CITED

The following references are of record in the file of this patent:

UNITED STATES PATENTS

| Number | Name | Date |
|---|---|---|
| 886,639 | Renner | May 5, 1908 |
| 1,555,603 | Overing | Sept. 29, 1905 |
| 1,363,477 | Lowe | Dec. 28, 1920 |
| 1,378,783 | Griffieth | May 17, 1921 |
| 1,818,886 | Erickson | Aug. 11, 1931 |
| 1,899,555 | Campbell | Feb. 28, 1933 |
| 2,027,499 | Tully | Jan. 14, 1936 |